United States Patent
Bouvet

(10) Patent No.: US 10,091,708 B2
(45) Date of Patent: Oct. 2, 2018

(54) METHOD AND AN ENTITY FOR PROCESSING A MESSAGE

(71) Applicant: Orange, Paris (FR)

(72) Inventor: Bertrand Bouvet, Perros Guirec (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/403,131

(22) PCT Filed: May 17, 2013

(86) PCT No.: PCT/FR2013/051086
§ 371 (c)(1),
(2) Date: Nov. 21, 2014

(87) PCT Pub. No.: WO2013/178909
PCT Pub. Date: Dec. 5, 2013

(65) Prior Publication Data
US 2015/0131478 A1    May 14, 2015

(30) Foreign Application Priority Data
May 29, 2012 (FR) .................................. 12 54919

(51) Int. Cl.
*H04L 12/28* (2006.01)
*H04W 48/14* (2009.01)
(Continued)

(52) U.S. Cl.
CPC ......... *H04W 48/14* (2013.01); *H04L 65/1006* (2013.01); *H04L 65/1069* (2013.01);
(Continued)

(58) Field of Classification Search
None
See application file for complete search history.

(56) References Cited

U.S. PATENT DOCUMENTS

2006/0252444 A1* 11/2006 Ozugur ................. H04M 3/465
455/519
2007/0255683 A1* 11/2007 Cox ................... G06F 17/30457
(Continued)

FOREIGN PATENT DOCUMENTS

EP    2 205 020 A1    7/2010
JP    2007-194721    8/2007
(Continued)

OTHER PUBLICATIONS

IETF RFC 3261, SIP: Session Initiation Protocol, Rosenberg, et. al., Jun. 2002.*
(Continued)

*Primary Examiner* — Jutai Kao
(74) *Attorney, Agent, or Firm* — Knobbe, Martens, Olson & Bear, LLP

(57) ABSTRACT

Disclosed is a processing method for processing a received message coming from a first device and sent to a second device managed by a multimedia IP core network, the method being for implementation by a processor entity when the received message is a message for discovering the capabilities and the status of the second device. In some embodiments, the processing method comprises obtaining an identifier of the first device from a field in the received discovery message and acting as a function of said identifier to select a response mode for responding to the received discovery message, the mode being selected from a predefined set containing at least two response modes.

20 Claims, 3 Drawing Sheets

(51) Int. Cl.
*H04L 29/06* (2006.01)
*H04M 7/00* (2006.01)
*H04W 8/00* (2009.01)
*H04W 88/02* (2009.01)

(52) U.S. Cl.
CPC ........ *H04L 65/1073* (2013.01); *H04M 7/006* (2013.01); *H04W 8/005* (2013.01); *H04W 88/02* (2013.01)

(56) References Cited

U.S. PATENT DOCUMENTS

| | | | |
|---|---|---|---|
| 2008/0229390 | A1 | 9/2008 | Holm et al. |
| 2009/0178005 | A1* | 7/2009 | Jheng ............... G06F 3/0482 715/825 |
| 2009/0316690 | A1* | 12/2009 | Kim ................. H04L 12/66 370/352 |
| 2010/0312897 | A1* | 12/2010 | Allen ............... H04L 12/1822 709/227 |
| 2011/0019650 | A1* | 1/2011 | van Niekerk ....... H04L 65/1069 370/338 |
| 2011/0113141 | A1 | 5/2011 | Veenstra et al. |
| 2011/0314140 | A1 | 12/2011 | Stille et al. |
| 2012/0225652 | A1* | 9/2012 | Martinez ........... H04M 3/42374 455/435.1 |

FOREIGN PATENT DOCUMENTS

| | | |
|---|---|---|
| JP | 2008-546347 | 12/2008 |
| JP | 2009-33299 | 2/2009 |
| JP | 2009-177538 | 8/2009 |
| JP | 2010-239280 | 10/2010 |
| WO | WO 2006-137646 | 12/2006 |
| WO | WO 2010/099829 A1 | 9/2010 |

OTHER PUBLICATIONS

Gallego Gómez O. et al. RCS-e—Advanced Communications: Services and Client Specification Version 1.1. GSMA Rich Communications, 152 pages. Apr. 8, 2011.
Rosenberg, et al. SIP: Session Initiation Protocol. Network Working Group, Request for Comments: 3261, 269 pages. Jun. 2002.
3rd Generation Partnership Project; Technical Specification Group Services and Systems Aspects; Service requirements for the Internet Protocol (IP) Multimedia core network Subsystem (IMS); Stage 1. 3GPP TS 22.228, Release 11, V11.4.0, 34 pages. Sep. 2011.
International Search Report dated Sep. 19, 2013, for International Application No. PCT/FR2013/051086 filed May 17, 2013, 7 pages.
International Search Report and Written Opinion dated Sep. 19, 2013, for International Application No. PCT/FR2013/051086 filed May 17, 2013, 11 pages.
Office Action dated May 31, 2017 for Chinese Patent Application No. 201380034252.X.
Office Action dated May 29, 2017 for Japanese Patent Application No. 2015-514553.

\* cited by examiner

METHOD AND AN ENTITY FOR PROCESSING A MESSAGE

RELATED APPLICATIONS

This application is the U.S. National Phase of Application No. PCT/FR2013/051086 entitled "METHOD AND ENTITY FOR PROCESSING A MESSAGE" filed May 17, 2013, which designated the United States, and which claims the benefit of French Application No. 1254919 filed May 29, 2012.

BACKGROUND OF THE INVENTION

The invention relates to the general field of telecommunications and to multimedia Internet protocol (IP) network architectures, such as network architectures using in particular the so-called "voice over IP" (VoIP) technology.

A preferred but non-limiting application of the invention lies in the context of multimedia IP core networks using the multimedia session initiation protocol (SIP) as defined by the Internet Engineering Task Force (IETF) standard and as described in particular in Document RFC 3261 entitled "SIP: session initiation protocol", published in June 2002 by the IETF. The invention applies in particular to multimedia IP core networks relying on an IP multimedia subsystem (IMS) architecture as proposed by the third generation partnership project (3GPP) standard.

Nevertheless, it may also be used in association with other message IP core network architectures, such as for example proprietary architectures, using or not using the SIP protocol in order to set up multimedia sessions (i.e. voice, text, video, data, etc. sessions).

The invention relates more particularly to using a processor entity to process a message received from a first device and sent to a second device (such as a terminal or a server) managed by a multimedia IP core network, in the context of a multimedia communications service relying on a mechanism for automatically discovering the capabilities and the status of the remote party (in other words, in this context, of the second device).

In known manner, such an automatic discovery mechanism provides for the first device to send a specific message to the "remote" second device inviting it to declare in response to that message firstly its status (e.g. availability, busy, out of coverage, not registered, etc.), and secondly its capabilities, i.e. the services, protocols, and/or applications that it supports or uses.

In the description below, that specific message is referred to as a message "for discovering the capabilities and the status of the remote party" or as a message "for discovering the capabilities and the status of the second device". One example of such a message in the SIP protocol is a message relying on the SIP OPTIONS method.

This automatic discovery mechanism is used in particular by the rich communication suite—enhanced (RCS-e) message service as described in the document entitled "RCS-e advanced communications: services and client specification", Version 1.1, Apr. 8, 2011.

In known manner, the RCS-e standard enables two terminals that are registered with an IMS core network to set up communication via a circuit-switched network that is not connected to the IMS core network (e.g. via a global system for mobile communications network (GSM)), and then in parallel with or at the margin of that communication, to make use of additional message services known as "enriched communication" passing via a packet-switched network that is connected to the IMS core network, such as for example a service for transferring photos, an instant messaging service, a file sharing service, etc.

For this purpose, and in particular when creating a contact in the contacts list of a first terminal or when setting up a call between a first terminal and a second terminal, the RCS-e standard makes provision to use a mechanism enabling the first terminal automatically to discover the status and the RCS-e capabilities of the second terminal (and vice versa), based on using an SIP OPTIONS message.

The use of a mechanism for automatically discovering the status and the capabilities of the remote party may also be envisaged in the context of an after-sales service provided by a telecoms operator or by a service supplier, in order to obtain relevant information concerning the status and the capabilities of a device on which a maintenance operation is programmed or desired.

In accordance with the SIP protocol, any device receiving an SIP OPTIONS discovery message is required to respond thereto in transparent manner, by sending an appropriate response message to the device that sent the discovery message, which response message specifies its status and contains its capabilities.

Thus, for example, if the second device is available and compatible with the RCS-e service, it sends a 200 OK message to the first device, containing, in a "feature tag" field, the identifier of the RCS-e service, together with the identifiers of other services supported by the second device (via other features tags and/or session description protocol (SDP) sessions). The 200 OK response message also contains the SIP methods supported by the second device, etc.

It should be observed that, in accordance with the standard, an SIP OPTIONS message is received by the second device without the user of the second device being made aware of it. It is not specifically signaled to the user and it does not trigger any ringing of the second device or notification that the SIP OPTIONS message has been received.

Thus, the SIP standard nowadays makes it possible for any device to send an SIP OPTIONS message and discover, in entirely discrete manner, the status and/or the capabilities of a remote device, without the user of that remote device being informed that the discovery mechanism has been used and without leaving any trace of such use.

It can thus be understood that that mode of operation can lead to abuse. In particular, it can be feared that unprincipled economic players will send unwanted SIP OPTIONS messages in order to obtain information concerning the terminals of users, and in order to use such information for purely commercial purposes (e.g. reselling such information to commercial companies).

There therefore exists a need for a mechanism that provides protection against such abuse.

OBJECT AND SUMMARY OF THE INVENTION

The invention satisfies this need in particular by providing a processing method for processing a received message coming from a first device and sent to a second device managed by a multimedia IP core network, the method being for implementation by a processor entity when the received message is a message for discovering the capabilities and the status of the second device. The processing method of the invention is remarkable in that it comprises:
  an obtaining step of obtaining an identifier of the first device from a field in the received discovery message; and a selection step of acting as a function of said identifier to select a response mode for responding to the received discovery message, the mode being selected from a predefined set containing at least two response modes.

Correspondingly, the invention also provides a processor entity for processing a received message coming from a first device and sent to a second device managed by a multimedia IP core network, the entity comprising means that are activated if the received message is a message for discovering the capabilities and the status of the second device, which means comprise:

means for obtaining an identifier of the first device from a field of the received discovery message; and means suitable for acting as a function of the identifier to select a response mode for responding to the received discovery message, which mode is selected from a predefined set containing at least two response modes.

In order to protect against the above-mentioned abuse, the invention thus proposes filtering messages for discovering the capabilities and the status of the remote party as sent to a second device, and to do so as a function of the origin of the messages.

In accordance with the invention, the filtering is performed by taking account of the identity of the first device originating the discovery message in order to decide on a mode (i.e. a strategy) for responding to the discovery message (e.g. no response or a transparent response).

In other words, the invention introduces an additional degree of freedom in the way in which a response is given to a message for discovering the capabilities and the status of a remote party: it gives the processor entity the ability to determine the kind of response to be made to the discovery message as a function of the identifier of the first device.

As a corollary, the invention makes it possible to configure the processor entity so that a transparent responses is given to a discovery message (i.e. by sending a response message containing the "real" status and capabilities of the second device) only to devices that are authorized or selected, e.g. by the user of the second device or by the operator of the multimedia IP core network.

Thus, the invention makes it possible to counter the opportunity that the present SIP standard gives to the first device to discover the status and the capabilities of the second device without the knowledge of the user of the second device. In the invention, by making a plurality of potential response modes available for responding to the discovery message, it is possible to adapt the quantities and the kinds of information given to the first device in those response modes as a function of the identity of the first device.

It is possible to envisage the predefined set containing a variety of response modes from which the processor unit can make a selection in order to counter the above-mentioned abuse. Such response messages may advantageously be specified personally by the user of the second device, via a user interface (e.g. a web interface or application developed for this purpose), or else by the operator of the multimedia IP core network.

Preferably, the predefined set of response modes contains at least:

a response mode comprising sending to the first device a response to the discovery message that is partial, predefined, or erroneous; and a response mode comprising sending to the first device a response to the discovery message that is transparent, containing the capabilities and the status of the second device.

In these response modes, some kind of response is always sent to the first device, which complies with the obligation to respond as specified in particular in the SIP protocol.

In contrast, the content proper of the response is adapted as a function of the identifier of the first device. It is thus possible to configure the processor entity by using appropriate selection rules to send to the first device:

a response that is transparent, i.e. that represents and/or contains all of the capabilities and the real status of the second device, e.g. when the identifier satisfies a predetermined criterion; or a predefined response that is partial (i.e. incomplete in the sense that it gives only some of the capabilities of the second device or that it represents only its status), or a response that contains information that is erroneous, when the identifier does not satisfy the criterion.

By always sending a response to the first device, which response may or not be transparent, it is possible to prevent the first device retransmitting messages as a result of not receiving a response message to the discovery message. This preserves network loading while still keeping control over the information that is sent to the first device about the status and the capabilities of the second device.

In a variant, it is possible to envisage that the predefined set contains at least:

a response mode comprising sending to the first device a response to the discovery message that is transparent, containing the capabilities and the status of the second device; and a response mode comprising no response to the discovery message.

Providing a response mode in which no response is sent to the first device may present the user of the second device with an advantage in terms of billing.

In addition to disclosing "private" information about the second device, the automatic discovery mechanism preferably provided by the SIP standard also raises the problem of billing for sending a response message to the first device, and concerning the cost that that response may represent overall as a result of the second device responding to all of the SIP OPTIONS messages it receives.

More precisely, the cost associated with sending a response message to an SIP OPTIONS message naturally lies with the second device (or at least it is entered into accounts as a debit for the uplink involving the user of the second device, to be billed depending on that user's subscription with the operator of the network). The invention thus enables the user of the second device to select those devices to which that user desires to respond, and thereby limits the associated costs.

It should be observed that the invention applies to messages for discovering the capabilities and the status of a remote party in a manner that is targeted, and does not apply to all messages sent to the second device. The invention seeks to protect the user of the second device against misuse of private information about the second device that is requested by means of messages that are received without the user being aware of them, and to which the second device is required to respond in compliance with the standard. The invention is not concerned, properly speaking, with processing messages of types other than messages for discovering the status and the capabilities of the remote party.

In a particular implementation, the discovery message processed by the processor entity is an SIP OPTIONS message and the field of this message that contains the identifier of the first device is a FROM field or a P-Asserted-Identity field (in particular in the event of the identifier of the first device being masked).

As mentioned above, the response mode used with the discovery message may be selected as a function of various criteria relating to all or part of the identifier of the first device (typically to all or part of the content of the FROM field or of the P-Asserted-Identity field for an SIP OPTIONS message) and as a function of various predetermined selection rules.

Thus, for example, the processor unit may select a response mode from the predefined set as a function of the presence or the absence of the identifier of the first device in at least one predefined list of identifiers associated with the second device.

This list may be defined in particular by the user of the second device as a function of those devices to which the user accepts sending information about the status and the capabilities of the user's own device.

It may equally well be a list containing the identifiers of devices accepted by the user, or on the contrary a "black list" containing the identifiers of devices to which the user desires not to communicate the status and the capabilities of the user's own device.

It is also possible to envisage defining a list of identifiers to which the user desires to communicate only a portion of that user's capabilities and status.

In a particular implementation, the predefined list of identifiers associated with the second device may be in the form of a list of contacts (repertory) associated with the second device and stored locally on the second device or on the contrary on remote equipment, in the multimedia IP core network (on an application server or in an information system of the operator of the core network) or in some other network (e.g. on a gateway giving access to the multimedia IP core network, or on equipment such as a terminal connected to a local network to which the second device is also connected, etc.).

This variant makes it possible to simplify implementing the invention by using a list that is already available for other applications (no prior configuration of the list is required).

Furthermore, it is based on identifiers already known to the second device and corresponding to devices with which the user of the second device has, a priori, already accepted communication at some time or another.

In another implementation, the processor entity selects a response mode from the predefined set as a function of whether or not the identifier of the first device belongs to network domain that is identical to the network domain of the second device or to a network domain that is authorized.

This implementation makes it possible to take account of network parameters for filtering discovery messages.

It presents a preferred application, e.g. for filtering discovery messages coming from abroad (e.g. by filtering all identifiers having an extension other than ".fr" for the domains of the French network), or from networks operated by operators other than the operator of the multimedia IP core network managing the second device, in particular for billing reasons.

In another implementation, the processor entity selects a response mode from the predefined set depending on whether the identifier of the first device does or does not include a user part that is predetermined or of a predetermined type (such as an international telephone number prefix or a particular uniform resource identifier (URI), for example).

The term "user part" is used to mean that part of the identifier that is specific to the user of the first device, i.e. that identifies the user of the first device and that does not correspond to the domain or the network managing it. For example, for an identifier in the form of an address of the type "user name@domain name", the user part corresponds to the "user name" element situated to the left of the "@" symbol.

For an SIP OPTIONS message, the user part of the identifier corresponds to the "User-Part" of the content of the FROM field or of the P-Asserted-Identity field.

Naturally, the invention is not limited to one particular filter criterion or to one particular selection rule, and a plurality of filter criteria may be applied simultaneously or in succession in order to select the response mode.

Furthermore, filter criteria other than those mentioned above may be envisaged that relate to all or part of the identifier of the first device, either in combination with or independently of one another.

In an implementation in which the predefined set contains at least one response mode where a response to the discovery message is sent to the first device, this response (i.e. its content) depends on a number and/or a type of ongoing sessions for the second device on receiving the message.

It is thus possible to adapt the response sent to the first device as a function for example of whether or not there is already an ongoing dialog in existence with the first device. In such a context, it is less troublesome to send a transparent response to the first device since it is already in communication with the second device. On the contrary, this may make it easier to facilitating access to the multimedia service in the context of which the discovery message was sent by the first device.

Furthermore, it may be useful to inform the first device of the status of ongoing sessions at the second device so that the first device can act, where appropriate, to adapt its exchanges with the second device.

The processing of discovery messages in accordance with the invention may be implemented at various levels.

Thus, the processor entity may be incorporated in particular in the second device.

This makes it easier for the user of the second device to configure the filtering made possible by the invention (filter criteria and selection rules, in particular).

In a variant, the processor entity may be incorporated in an application server of the multimedia IP core network managing the second device. The application server may for example be triggered by the multimedia IP core network on receiving a discovery message sent to the second device.

This makes it easier for the operator of the multimedia IP core network to configure the filtering.

Furthermore, in this variant, there is no need to modify the present operating mode of devices that receive discovery messages, which devices can continue to act in compliance with the standard by responding in transparent manner to discovery messages. Filtering is then performed by the application server of the multimedia IP core network on receiving responses from those devices.

The invention also provides a terminal managed by a multimedia IP core network and including a processor entity of the invention for processing a message received from a device and sent to the terminal.

The invention also provides a server associated with a multimedia IP core network managing a device, the server including a processor entity of the invention for processing a received message sent to the device.

By way of example, the server is an application server of the multimedia IP core network.

In a variant, it may be the device to which the received message is sent.

In a particular implementation, the various steps of the processing method are determined by computer program instructions.

Consequently, the invention also provides a computer program on a data medium, the program being suitable for being implemented in a processor unit or more generally in a computer, the program including instructions adapted to performing steps of a processing method as described above.

The program may use any programming language, and be in the form of source code, object code, or code intermediate between source code and object code, such as in a partially complied form, or in any other desirable form.

The invention also provides a computer readable data medium including computer program instructions as mentioned above.

The data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

In another aspect, the invention also provides a communications system comprising:
- a first device and a second device managed by a multimedia IP core network, the first device being adapted to send to the second device a discovery message for discovering the capabilities and the status of the second device; and
- a processor entity of the invention suitable for receiving and processing the discovery message sent by the first device to the second device.

In other implementations, it is also possible to envisage that the processing method, the processor entity, and the communications system of the invention present in combination all or some of the above-specified characteristics.

BRIEF DESCRIPTION OF THE DRAWINGS

Other characteristics and advantages of the present invention appear from the following description made with reference to the accompanying drawings that show implementations having no limiting character.

DETAILED DESCRIPTION OF THE INVENTION

Figure 1:
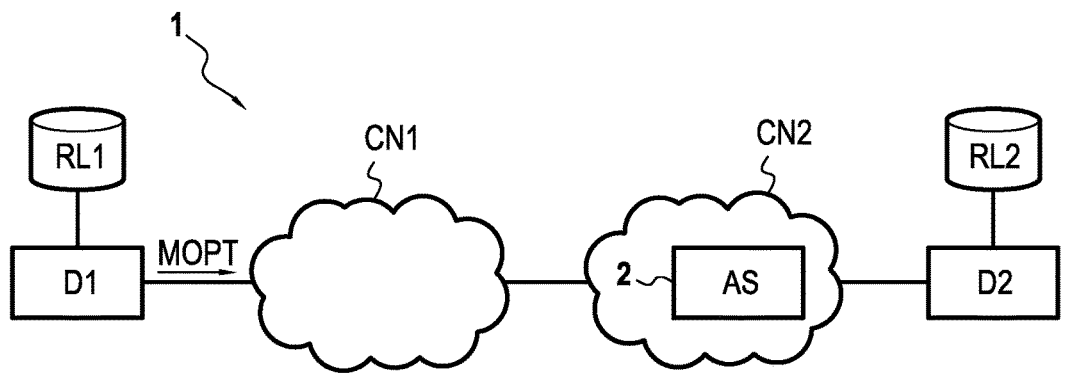
FIG. 1 is a diagram showing a communications system and a processor entity in accordance with the invention, in a first implementation.

FIG. 1 shows, in its environment, a communications system 1 in accordance with the invention, which system includes two devices D1 and D2 together with a processor entity 2 of the invention in a first implementation.

By way of example, the devices D1 and D2 are multimedia terminals, such as smart phones, suitable for communicating with each other via multimedia IP core networks CN1 and CN2. Each of them has a local contacts list (or "address book") with respective references RL1 and RL2, containing various identifiers (e.g. telephone numbers, SIP addresses, etc.) of equipment known and listed by the respective users of the devices D1 and D2 (and/or by the operators of the core networks CN1 and CN2).

In this example, the core networks CN1 and CN2 are core networks using VoIP technology and they manage the devices D1 and D2 respectively. They implement an IMS architecture, as defined in particular in Document 3GPP TS 22.228 "Service requirements for the IP multimedia core network subsystem (stage 1)", and they implement the SIP protocol.

Nevertheless, in a variant, the invention applies equally well when the core networks CN1 and CN2 constitute a single multimedia IP core network. The invention also applies to other types of device (D1 may be a terminal and D2 may be a server), to other multimedia IP core networks architectures, and to other session initiation protocols, such as for example proprietary core network architectures using the SIP protocol or some other proprietary session initiation protocol that makes provision for a message to discover the capabilities and the status of a remote party.

In the presently described example, consideration is given to the processor entity 2 processing a received MOPT message for discovering the capabilities and the status of a remote party as sent by the first device D1 to the second device D2, in the context of a multimedia communications service, such as for example an RCS-e service. It is assumed that the devices D1 and D2 are registered with their respective core networks CN1 and CN2.

The MOPT message sent by the device D1 is an SIP OPTIONS message, as described in detailed manner in the above-mentioned Document RFC 3261. It contains in a FROM field, an identifier ID1 of the device D1 originating the message, and in a Request-URI field and in a TO field, an identifier ID2 of the destination device D2 of the message.

It is assumed that the user of the device D2 has subscribed with the operator of the core network CN2 to activation of a service for filtering SIP OPTIONS messages that are sent thereto as a function of the identifiers of the devices originating those messages and relying on implementing the processing method of the invention.

Activation of the service for filtering SIP OPTIONS messages for the device D2 is stored in a user profile of the device D2 stored in the home subscriber server (HSS) of the multimedia core network CN2 (not shown in FIG. 1).

In the first implementation shown in FIG. 1, the processor entity 2 of the invention for processing SIP OPTIONS messages is incorporated in an application server (AS) of the core network CN2, and it is triggered on detecting an SIP OPTIONS message sent to the device D2. In other words, the application server 2 is a processor entity in the meaning of the invention.

The application server 2 is triggered in accordance with the information contained in the user profile of the user of the device D2 and stored in the HSS of the core network CN2, and in particular in accordance with the initial filter criteria (iFC), which information is stored on the user subscribing to activate the filter service. The application server 2 may be a server dedicated to performing the method of the invention for processing SIP OPTIONS messages, or it may be an application server that already exists and that is triggered when implementing other applications.

The mechanisms implemented for detecting SIP OPTIONS messages sent to the device D2 and for triggering the application server 2 are known to the person skilled in the art; they are therefore not described in greater detail herein.

By way of example, the application server 2 may be triggered by a serving call session control function (S-CSCF) server of the core network CN2 or by some other server situated downstream from the S-CSCF server, after detecting that the MOPT message received from the device D1 is an SIP OPTIONS message sent to the device D2 (identified in particular by means of the "Request-URI" field or the "TO" field of the received MOPT message), which device D2 has activated the service of the invention for filtering SIP OPTIONS messages sent thereto.

Figure 2:
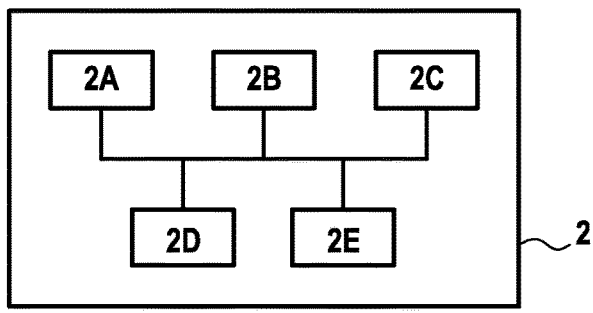
FIG. 2 is a diagram showing the hardware architecture of the processor entity shown in FIG. 1.

In this example, the application server 2 has the hardware architecture of a computer, as shown diagrammatically in FIG. 2.

In particular, it comprises a processor 2A, a random access memory (RAM) 2B, a ROM 2C, a non-volatile flash memory 2D, together with communications means 2E suitable in particular for performing the SIP protocol. These communications means enable it to communicate with entities of the core network CN2 and with the device D2.

The ROM 2C of the application server 2 constitutes a data medium in accordance with the invention that is readable by the processor 2A and that stores a computer program in accordance with the invention, including instructions for executing steps of a processing method in the first implementation of the invention, as described below with reference to FIG. 3.

Figure 3:
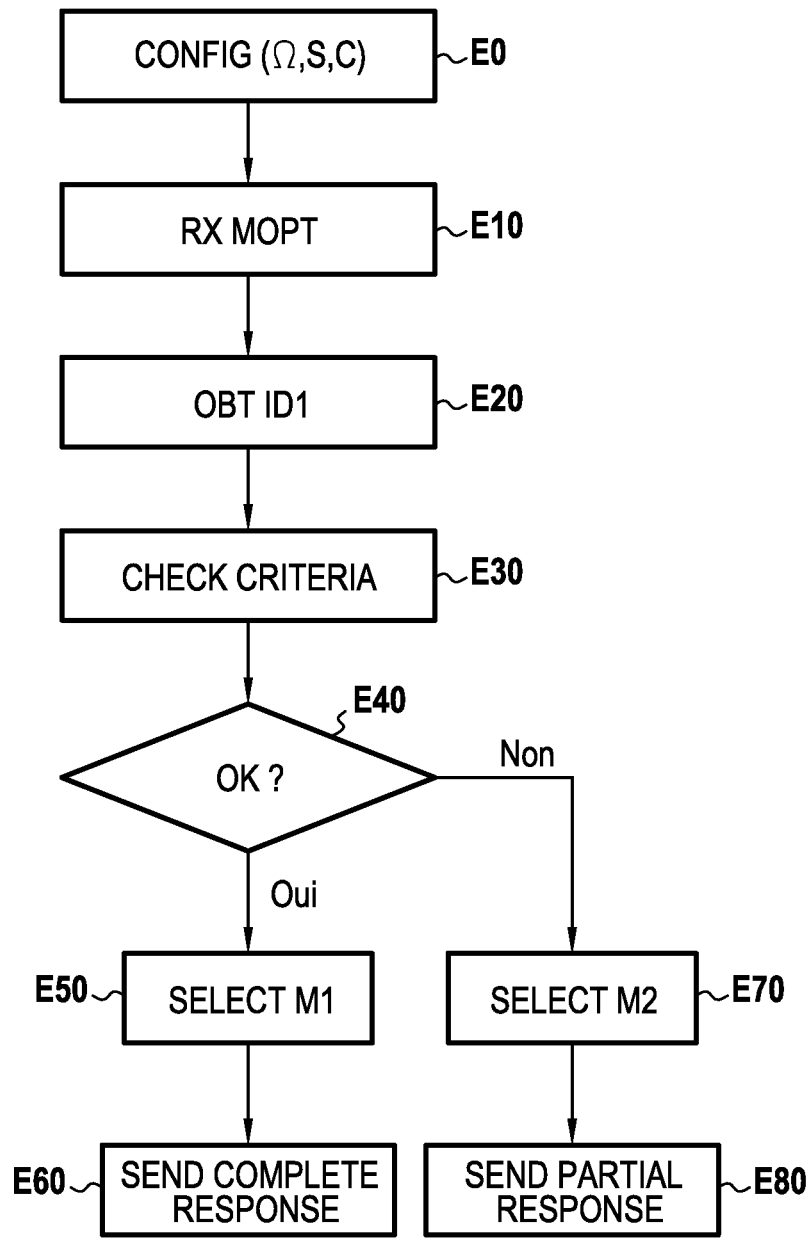
FIG. 3 shows the main steps of a processing method in accordance with the invention as performed by the FIG. 1 processor entity in the first implementation.

FIG. 3 shows the main steps of a processing method of the invention as performed by the application server 2 of FIG. 1 in the first implementation, after being triggered on the core network CN2 receiving an SIP OPTIONS MOPT message sent by the device D1 to the device D2.

As described above, the processing proposed by the invention consists in filtering discovery messages (such as OPTIONS messages in the SIP protocol) as a function of the identifiers of devices originating such messages, and in acting, as a function of said identifiers, to select a response mode from a predefined set of response modes containing at least two response modes.

The implementation of this processing relies on a prior definition of three sets, namely:

1) a set, written $\Omega$, of possible response modes for responding to received discovery messages;

2) a set, written C, made up of one or more criteria for comparison with the identifiers of the devices originating such discovery messages (these criteria may relate to some or all of the identifiers); and 3) a set, written S, of selection rules for associating an identifier of a device originating a discovery message with a response mode of the set $\Omega$ when the identifier satisfies one or more of the criteria determined by the set C.

Thus, by way of illustration, the following response modes may be envisaged for the set $\Omega$:

no response to the discovery message;

sending a transparent response to the discovery message, i.e. a response containing the status and the capabilities of the interrogated device (i.e. in this example D2), as presently defined in the SIP standard;

sending a partial response to the discovery message, e.g. constituted by a message representing the status of the interrogated device but without including its capabilities, a message representing the status of the interrogated device and only some of its capabilities, or indeed a predefined message containing its capabilities only;

sending a predefined response to the discovery message, e.g. in the SIP protocol constituted by one of the following messages: "404 NOT FOUND"; "480 TEMPORARILY UNAVAILABLE"; "408 TIME OUT"; "200 OK"; or "486 BUSY HERE"; and sending an erroneous response to the discovery message, e.g. representing a status that is different from the real status of the interrogated device and/or sending capabilities that do not correspond to the capabilities of the interrogated device.

In similar manner, the following criteria relating to some or all of the identifiers of the device originating the discovery message may be envisaged for the set C:

the presence or absence of the identifier of the device originating the discovery message in a predefined list associated with the interrogated device. This list may in particular be a local contacts list (or "address book") stored on the interrogated device or stored in remote equipment in the network (e.g. in the multimedia IP core network CN2 at the application server 2 or in an information system of the operator of the network of the device D2, etc.). In a variant, it may be a list of identifiers of devices authorized to receive the status and the real capabilities of the interrogated device, e.g. stored at the application server 2 or in an information system of the operator of the network of the device D2 and that can be consulted by the application server 2, and that is configured by the user of the interrogated device. In another variant, it may be a list configured by the user made up of "banned" identifiers with which the user refuses to communicate the status and the capabilities of the user's device, e.g. stored at the application server 2 or in an information system of the operator of the network of the device D2 and suitable for being consulted by the application server 2;

whether or not the identifier of the device originating the discovery message belongs to a network domain identical to the domain of the network of the interrogated device or to a domain that is authorized (by the operator of the core network or by the user of the interrogated device);

whether or not the identifier of the device originating the discovery message is present in a predetermined user part (i.e. the "User Part" of the identifier for an SIP OPTIONS message) or of a predetermined type (e.g. containing an international number different from the prefix "+33", or a specific prefix such as "+331", "+335", "+338", or "+339", or corresponding to a particular type of URI such as an SIP URI or a TEL URI);

etc.

Finally, it is possible to envisage the following selection rules for the set S:
- if the identifier of the device originating the discovery message is not present in the local contacts list of the interrogated device, then a "no response to the discovery message" response mode is selected;
- if the identifier of the device originating the discovery message is present in the local contacts list of the interrogated device, then the "send a transparent response to the discovery message" response mode is selected;
- etc.

Naturally, these examples are given purely by way of illustration and other response modes, other criteria relating to identifiers in full or in part, and other selection rules may be envisaged within the ambit of the invention.

Specifically, it is also possible to define selection rules relying on a plurality of criteria (e.g. if the identifier of the device originating the discovery message is in the same network domain as the identifier of the interrogated device and in the local contacts list of the interrogated device, then the response mode is selected that consists in sending a transparent response to the device originating the discovery message).

Furthermore, it is also possible to envisage other response modes in which the content of the response depends on parameters such as the status of the device D2 and in particular the number of sessions that are already ongoing with the device D2 and/or the type of sessions already ongoing (e.g. as a function of services that are available or on the contrary of services that are in use).

In order to illustrate the steps performed by the application server 2 when processing the MOPT message, it is assumed that the following sets Ω, S and C have been defined:
- the set Q of response mode contains two response modes, namely:
  - mode M1: "transparent response to the discovery message"; and
  - mode M2: "partial response to the discovery message, containing only the status of the interrogated device";
- the set C of criteria contains a single criterion, namely: whether or not the identifier is present in the local contacts list of the interrogated device; and
- the set S of selection rules contains two rules, namely:
  - if the identifier is present in the local contacts list, then respond in mode M1; else
  - respond in mode M2.

These sets are stored in the flash memory 2D of the application server 2 during a prior configuration step (step E0). It should be observed that the selections in the sets Ω, S, and C may be made personally by the user of the device D2, e.g. via a web, voice, text, etc. interface.

There follows a description of the processing of the MOPT message as performed in accordance with the invention by the application server 2 after being triggered on detection of an SIP OPTIONS message sent to the device D2.

Triggering of the application server 2 leads to the application server 2 receiving the MOPT message (step E10).

The application server 2 extracts an identifier of the device D1 from the FROM field of the received MOPT message (step E20). The identifier of the device D1 contained in the FROM field in this example is the identifier ID1.

If the FROM field does not contain an identifier of the device D1 or represents the device D1 being anonymous (e.g. because the identifier of the device D1 is masked on transmission by the device D1), the application server 2 determines whether the MOPT message contains an SIP PRIVACY field.

Where appropriate, it then determines whether there exists a P-Asserted-Identity field in the MOPT message containing a certified entity of the device D1 as can be inserted and/or issued by the core network CN1 through which the MOPT message has passed after being sent by the device D1.

In known manner, networks conveying a message sent by one device to another device may insert a certified identifier of the device originating the message in order to satisfy various needs (e.g. billing, message routing, legal interceptions, etc.). In this example, this identifier is inserted by the core network CN1 in the P-Asserted-Identity field of the message.

Where appropriate, the application server 2 extracts the identifier of the device D1 that is contained in this P-Asserted-Identity field.

It then determines whether the identifier ID1 of the device D1 as extracted from the MOPT message satisfies one or more of the filter criteria defined in the set C as stored in the memory 2D (step E30).

In the presently envisaged example, only one criterion is stored in the memory 2D, namely the criterion "presence or absence of the identifier of the device originating the SIP OPTIONS message in the local contacts list of the interrogated device".

Thus, during step E30, the application server 2 examines whether the identifier ID1 of the device D1 is present (i.e. listed) in the local list RL2 of the device D2.

Where appropriate, (response "yes" to test E40), in accordance with the selection rules defined in the set S, the application server 2 selects the response mode M1 (step E50).

In other words, it sends the device D1 a transparent response to the SIP OPTIONS message containing the status of the device D2 together with its capabilities (step E60).

In the presently described implementation, the status of the device D2 and its capabilities are obtained by the application server 2 directly from the device D2.

More precisely, if the response to the test E40 is "yes", the application server 2 forwards (i.e. relays) the SIP OPTIONS MOPT message to the second device D2 without changing its content.

The device D2 then responds to the SIP OPTIONS message in transparent manner, in compliance with the SIP protocol, i.e. supplying its status and its capabilities. In compliance with the mode of operation of the SIP protocol, the response from the device D2 returns along the path that is the reverse of the path taken by the MOPT message. This response therefore transits via the application server 2.

It intercepts the response message coming from the device D2 and, using this message, it generates its own transparent response to the device D1 containing the status of the device D2 and its capabilities, in compliance with the selected response mode M1.

In the presently described implementation, the transparent response sent by the application server 2 to the device D1 is similar or identical to the response message to the SIP OPTIONS message as specified in the Document RFC 3261 of the SIP standard (same format and same content concerning the status and the capabilities of the device D2).

In contrast, if the identifier ID1 is not contained in the local contacts list RL2 of the device D2 (response no to the test E40), the application server 2 acts in accordance with the selection rules defined in the set S to select the response mode M2 (step E70).

In other words, it sends to the device D1 a partial response containing only the status of the device D2 (step E80). This partial response does not contain information about the capabilities of the device D2.

As mentioned above for step E60, the information about the status of the device D2 is obtained by the application server 2 interrogating the device D2, in this example by sending it the received SIP OPTIONS MOPT message.

It should be observed that if a response mode is envisaged (and selected) whereby the application server 2 responds in erroneous manner to the device D1 or by using a predetermined message such as a "404 NOT FOUND" or "480 TEMPORARILY UNAVAILABLE" or indeed "408 TIME OUT" message, the application server 2 need not consult the device D2 in order to obtain its status and its capabilities, and can respond directly to the device D1.

In contrast, whenever a response mode including a real status of the device D2 and/or its real capabilities is selected, then the application server 2 relays to the device D2 the SIP OPTIONS MOPT message it has received from the device D1, as it does so in transparent manner (i.e. without changing its content), after which it filters and/or adapts the response it receives from the device D2 to the SIP OPTIONS message as a function of the response rules configured for the selected response mode.

Thus, by way of example, if the application server 2 determines that the device D2 is in a busy state, it sends a "486 BUSY HERE" response message to the device D1 in which there is no information about the capabilities of the device D2.

In the above-described first implementation, the processing in accordance with the invention of the SIP OPTIONS MOPT message sent to the device D2 is performed by an application server 2 of the multimedia IP core network CN2. In other words, the processor entity of the invention is the application server 2.

Nevertheless, this assumption is not limiting, and the processor entity of the invention for processing the messages for discovering the status and the capabilities of the remote party may be incorporated in some other pieces of equipment, such as in particular the device to which the discovery message is sent.

Figure 4:
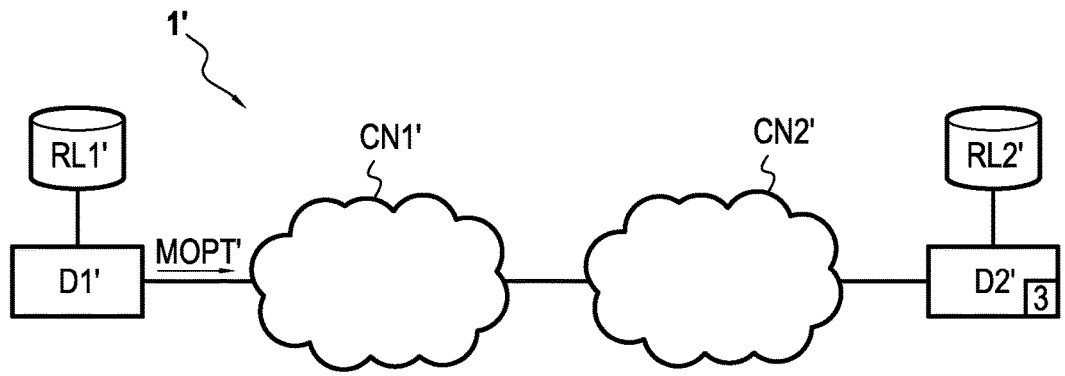
FIG. 4 is a diagram showing a communications system and a processor entity in accordance with the invention in a second implementation.

FIG. 4 shows, in its environment, a communications system 1' in accordance with the invention in a second implementation.

The communications system 1' includes two devices D1' and D2' respectively managed by a multimedia IP core network CN1' and by a multimedia IP core network CN2'. In this example, the devices D1' and D2' are terminals having local contacts lists, referenced respectively RL1' and RL2'.

In this second implementation, the processing in accordance with the invention of an MOPT' discovery message sent by the device D1' to the device D2' is performed by the device D2' itself. In other words, the device D2' is a processor entity in the meaning of the invention.

The devices D1', and the multimedia IP core networks CN1' and CN2' are similar or identical to the devices D1 and to the core networks CN1 and CN2 described with reference to FIG. 1, and they are not described again in detail herein.

The device D2' is similar to the device D2 of FIG. 1. Nevertheless, it differs from the device D2 in that it includes a ROM 3 storing a computer program in accordance with the invention having instructions for executing steps of a processing method in accordance with the second implementation of the invention. The ROM 3 constitutes a data medium in accordance with the invention that is readable by a processor of the device D2'.

Figure 5:
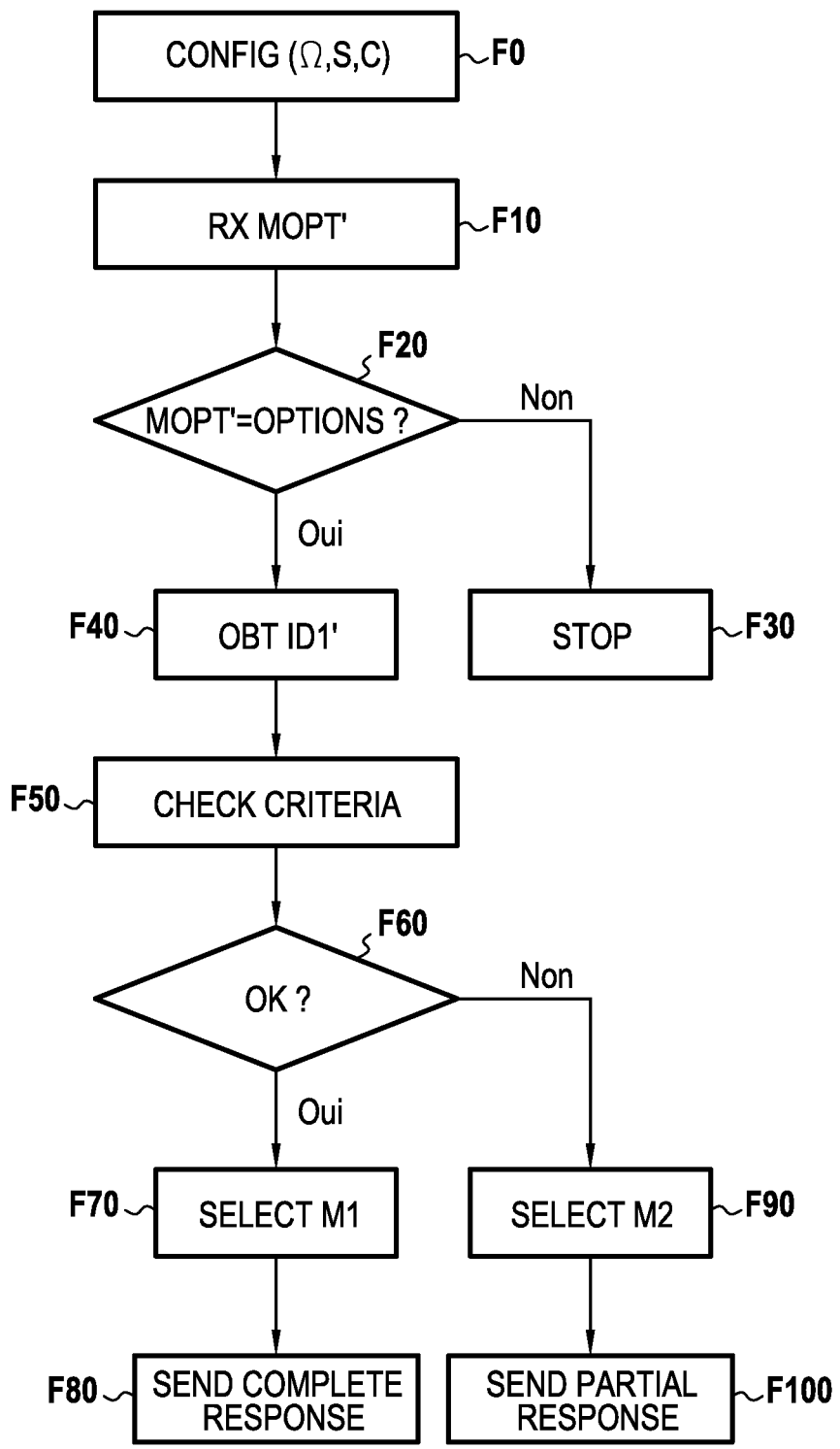
FIG. 5 shows the main steps of a processing method in accordance with the invention performed by the FIG. 4 processor entity in the second implementation.

With reference to FIG. 5, there follows a description of the main steps performed by the device D2' in this second implementation for processing a MOPT' message for discovering the status and the capabilities of the remote party as sent by the device D1' to the device D2'.

In this example, the MOPT' message is an SIP OPTIONS message as described in detail in Document RFC 3261. In a FROM field it contains an identifier ID1' of the device D1' that originated the message, and in a Request-URI field and in a TO field it contains an identifier ID2' of the device D2' to which the message is sent.

In order to illustrate the steps performed by the device D2' while processing the MOPT' message, the above-described sets Ω, S, and C are used again. Thus:

the set Ω of response modes contains two response modes, namely:
  mode M1: "transparent response to the discovery message"; and
  mode M2: "partial response to the discovery message, containing only the status of the interrogated device";
the set C of criteria contains a single criterion, namely: whether or not the identifier is present in the local contacts list of the interrogated device; and
the set S of selection rules contains two rules, namely:
  if the identifier is present in the local contacts list, then respond in mode M1; else
  respond in mode M2.

These sets are stored in a non-volatile flash memory of the device D2' during a prior configuration step (step F0). It should be observed that the configuration of the device D2', and more precisely the selection of the sets Ω, S, and C may be performed personally by the user of the device D2', e.g. via a web, voice, text, etc. interface.

The MOPT' message sent by the device D1' to the device D2' is received by the device D2' after passing via the core networks CN1' and CN2' (step F10).

On receiving the MOPT' message, the device D2' begins by determining whether it is a message for discovering its status and its capabilities, in other words whether it is an SIP OPTIONS message that needs to be processed in accordance with the invention (step F20).

If it is not an SIP OPTIONS message (response no in step F20), the device D2' processes the message conventionally, in the manner specified by the SIP protocol, and as a function of the type of the message (step F30).

If the received MOPT' message is an SIP OPTIONS message (response "yes" to step F20), the device D2' processes the message in accordance with the invention.

Thus:

it extracts the identifier ID1' of the device D1' from the FROM field or from the P-Asserted-ID field of the MOPT' message (step F40);
it determines whether the identifier ID1' satisfies one or more of the filter criteria defined in the set C as stored in its non-volatile flash memory (step F50): in other words, in this implementation, it verifies whether the identifier ID1' is or is not present in the local contacts list RL2' of the device D2';
where appropriate ("yes" response to test step F60), it selects the response mode M1 (step F70) and sends to the device D1' a transparent response to the SIP OPTIONS MOPT' message containing its own "real" status and capabilities (step F80); else (response no to the test step F60), it selects response mode M2 (step F90) and sends to the device D1' a partial response to the SIP OPTIONS MOPT' message containing only its status but not identifying its capabilities (step F100).

Since the steps F40, F50, F60, F70, and F90 are identical to the steps E20, E30, E40, E50, and E70, they are not described in greater detail herein. The steps F80 and F100 differ from the steps E60 and E80 respectively in that the device D2' generates directly the response to the SIP OPTIONS MOPT' message on the basis of its status and/or its capabilities.

In both implementations described herein, the SIP OPTIONS message is processed in accordance with the invention independently of whether or not any dialog is in existence between the devices D1 and D2 or between the devices D1' and D2'.

In a variant, it is possible to envisage processing the SIP OPTIONS messages in accordance with the invention only when they are sent in the context of a standalone transaction between the devices, i.e. a transaction that is not performed in the context of an already-established dialog established between the devices or that does not initiate such a dialog. In such a context, the invention presents an additional advantage since the device to which the discovery message is sent has not already given its agreement for communication with the device originating the discovery message.

The invention claimed is:

1. A processing method for processing a received message coming from a first device and sent to a second device managed by a multimedia IP core network, said method being for implementation by a processor entity when said received message is a message for discovering the capabilities and the status of the second device, and said processing method comprises:
   obtaining an identifier of the first device from a field in the received discovery message, wherein the discovery message is an SIP OPTIONS message and the field of this message that contains the identifier of the first device is a FROM field or a P-Asserted-Identity field; and
   selecting, based on said identifier, a response mode for responding to the received discovery message, the response mode being selected from a predefined set containing at least two response modes;
   wherein selecting a response mode comprises applying at least two selection rules, the selection rules comprising:
      a first selection rule associating at least one device identifier with a response mode comprising sending to the first device a response to the discovery message that is partial or erroneous, wherein a partial response to the discovery message gives only some of the capabilities of the second device or represents only the status of the second device, and wherein an erroneous response represents a status that is different from the status of the second device or comprises capabilities that do not correspond to the capacities of the second device; and
      a second selection rule associating at least one device identifier with a response mode comprising sending to the first device a response to the discovery message that is transparent, containing the capabilities and the status of the second device.

2. A processing method according to claim 1, wherein the processor unit selects a response mode as a function of the presence or the absence of the identifier of the first device in at least one predefined list of device identifiers associated with the second device.

3. A processing method according to claim 2, wherein said predefined list is a contacts list stored on the second device or on remote equipment.

4. A processing method according to claim 1, wherein the processor entity selects a response mode as a function of whether or not the identifier of the first device belongs to network domain that is identical to the network domain of the second device or to a network domain that is authorized.

5. A processing method according to claim 1, wherein the processor entity selects a response mode depending on whether the identifier of the first device does or does not include a user part that is predetermined or of a predetermined type.

6. A processing method according to claim 1, wherein the response sent to the first device also depends on a number and/or a type of ongoing sessions for the second device on receiving the message.

7. A computer having stored thereon a program comprising instructions which, when executed by said computer, cause said computer to perform the processing method according to claim 1.

8. A non-transitory computer readable data medium storing a computer program including instructions for executing the processing method according to claim 1.

9. A processing method according to claim 1, wherein the partial response to the discovery message gives only some of the capabilities of the second device, without representing the status of the second device.

10. A processing method according to claim 1, wherein the partial response to the discovery message represents only the status of the second device, without giving any of the capabilities of the second device.

11. A processor entity for processing a received message coming from a first device and sent to a second device managed by a multimedia IP core network, the entity comprising:
   a hardware processor executing software configured to be activated if the received message is a message for discovering the capabilities and the status of the second device, wherein said software is configured to obtain an identifier of the first device from a field of the received discovery message, wherein the discovery message is an SIP OPTIONS message and the field of this message that contains the identifier of the first device is a FROM field or a P-Asserted-Identity field, and wherein said software is configured to select, based on said identifier, a response mode for responding to said received discovery message, which response mode is selected from a predefined set containing at least two response modes, and; and
   wherein selecting a response mode comprises applying at least two selection rules, the selection rules comprising:
      a first selection rule associating at least one device identifier with a response mode comprising sending to the first device a response to the discovery message that is partial or erroneous, wherein a partial response to the discovery message gives only some of the capabilities of the second device or represents only the status of the second device, and wherein an erroneous response represents a status that is different from the status of the second device or comprises capabilities that do not correspond to the capacities of the second device; and a second selection rule associating at least one device identifier with a response mode comprising sending to the first device a response to the discovery message that is transparent, containing the capabilities and the status of the second device.

12. A terminal managed by a multimedia IP core network and including a processor entity according to claim 11 for processing a received message coming from a device and sent to said terminal.

13. The terminal according to claim 12, wherein the processor entity is configured to select a response mode as a function of the presence or the absence of the identifier of the first device in at least one predefined list of device identifiers associated with the second device.

14. A server associated with a multimedia IP core network managing a device, said server including a processor entity according to claim 11 for processing a received message sent to said device.

15. The server according to claim 14, wherein the processor entity is configured to select a response mode as a function of the presence or the absence of the identifier of the first device in at least one predefined list of device identifiers associated with the second device.

16. A communications system comprising:
a first device and a second device managed by a multimedia IP core network, the first device being configured to send a message for discovering the capabilities and the status of the second device; and
a processor entity according to claim 11 suitable for receiving said discovery message and for processing it.

17. The communications system according to claim 16, wherein the processor entity is configured to select a response mode as a function of the presence or the absence of the identifier of the first device in at least one predefined list of device identifiers associated with the second device.

18. The processor entity according to claim 11, wherein said software is configured to select a response mode as a function of the presence or the absence of the identifier of the first device in at least one predefined list of device identifiers associated with the second device.

19. The processor entity according to claim 18, wherein said predefined list is a contacts list stored on the second device or on remote equipment.

20. The processor entity according to claim 11, wherein said software is configured to select a response mode as a function of whether or not the identifier of the first device belongs to network domain that is identical to the network domain of the second device or to a network domain that is authorized.

* * * * *